Sept. 25, 1962 E. C. MUNDHENKE 3,055,530
AGRICULTURAL IMPLEMENT CLEANER
Filed Aug. 31, 1960 4 Sheets-Sheet 1

INVENTOR
Ernest C. Mundhenke

BY Shlesinger & Shlesinger
ATTORNEYS

Sept. 25, 1962     E. C. MUNDHENKE     3,055,530
AGRICULTURAL IMPLEMENT CLEANER
Filed Aug. 31, 1960     4 Sheets-Sheet 2
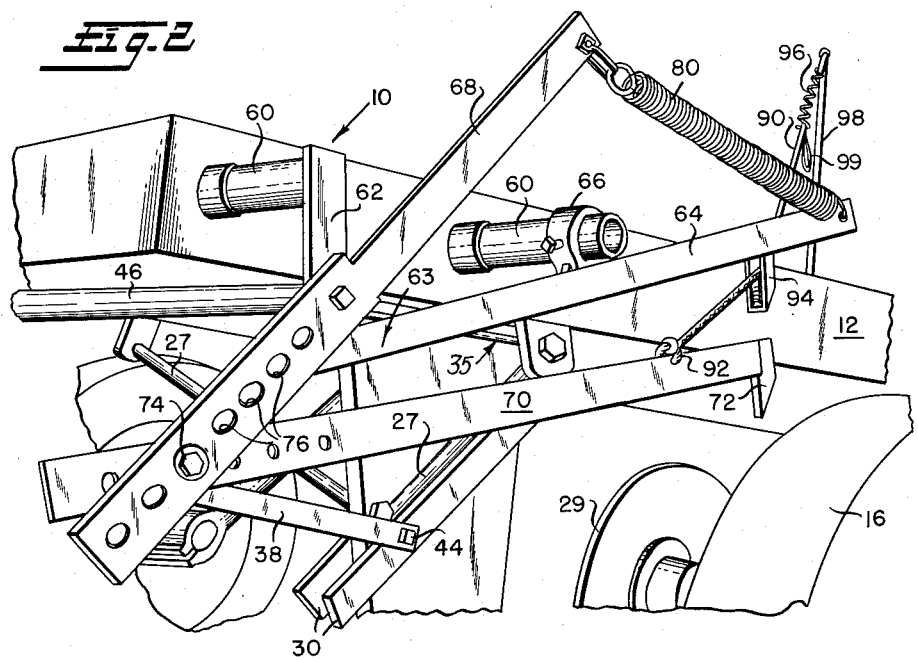
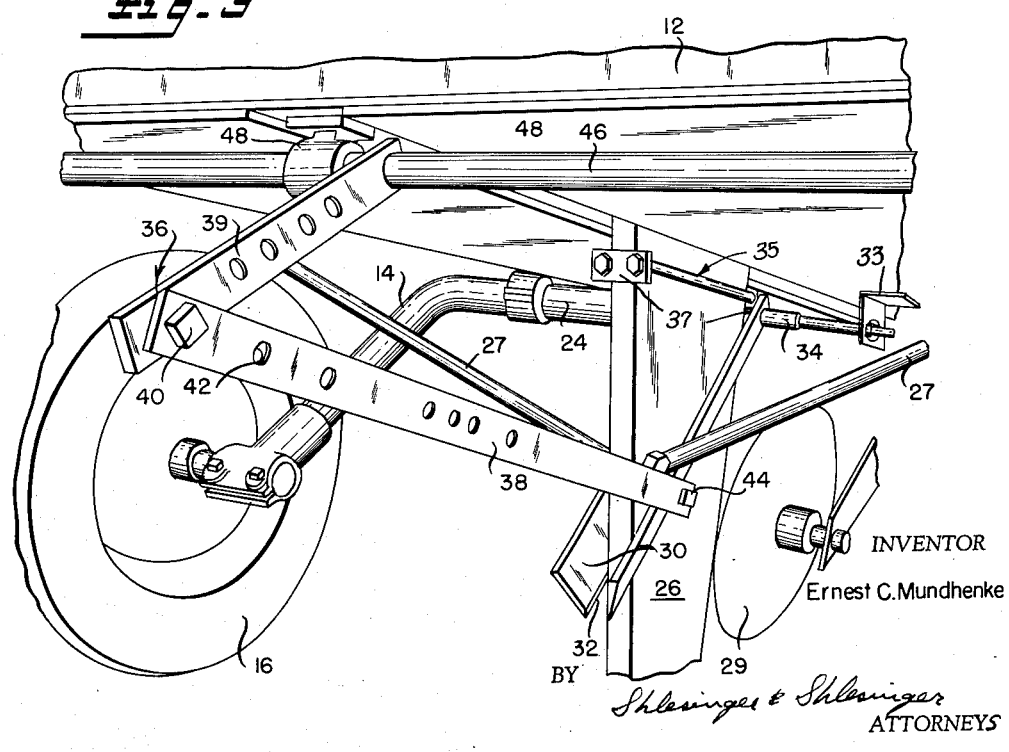
INVENTOR
Ernest C. Mundhenke
BY Shlesinger & Shlesinger
ATTORNEYS Sept. 25, 1962  E. C. MUNDHENKE  3,055,530
AGRICULTURAL IMPLEMENT CLEANER
Filed Aug. 31, 1960  4 Sheets-Sheet 3

INVENTOR
Ernest C. Mundhenke

BY Shlesinger & Shlesinger
ATTORNEYS

INVENTOR
Ernest C. Mundhenke

United States Patent Office 3,055,530
Patented Sept. 25, 1962

1

3,055,530
AGRICULTURAL IMPLEMENT CLEANER
Ernest C. Mundhenke, Lewis, Kans.
Filed Aug. 31, 1960, Ser. No. 53,128
13 Claims. (Cl. 172—66)

This invention relates to scraping-type cleaners for use on agricultural implements. More specifically the invention concerns a blade type scraper to be used to clean the ground contacting shank member of a tilling implement of the accumulated mud and weeds.

The implement shank cleaners of past and present devices have been of two general types. The first type of cleaner is a manually powered and manually operable cleaner such as is shown in U.S. Patent Number 1,779,285 to Munson. The second type of agricultural shank cleaner is the continuously operable scraping cleaner such as is represented by U.S. Patent Number 35,147 to Ford.

The first of these general types of agricultural cleaner blades are undesirable at the present time due to the fact that being manually powered, the operator must constantly exert effort when the cleaning action is desired. On modern farming equipment most of the tilling implements are towed by a tractor and hence there would be serious difficulty in mechanically connecting the member upon which the operator would exert a force and the implement shank of the tilling implement which is trailing the tractor.

The second of these general types of agricultural implement cleaners presents the difficulty that, being continuous in operation they continuously utilize power from the prime mover, e.g. the tractor, powering the implement. It has been found by the inventor that in farming practice it is unnecessary to operate the cleaners on ground contacting the shanks continuously and that only when weeds or trash or mud deposits build up on the shank to a noticeable degree is it necessary to effect a cleaning action. Considering the many types of ground conditions that exist in every community a more desirable implement cleaner would be one which uses power only when necessary rather than continuously draining power from the prime mover associated therewith. Also in an arrangement of the contemplated type there would be less frictional wear on the parts of the cleaning device.

It is, therefore, an object of this invention to provide an inexpensive blade-type cleaner unit for use on agricultural implements which overcomes this disadvantage. This blade-type cleaner is designed to be placed on implements such as: stubble mulchers, rod weeders, subsoilers and general ground cultivating type implements. Such a unit would present the feature of installation by the individual farmer on existing implements without special adaptation or expert skill.

A second object of this invention is to provide a blade-type cleaner which is power driven yet is manually controllable for operation or nonoperation.

It is a further object of this invention to take power from the ground contacting wheels or the implement and transfer the power to the shank-blade cleaners. Such power is taken from the wheels or wheel only when the mechanism is actuated by the selection made by the operator of the combined implement and tractor unit.

Due to the fact that mechanical connections between a tractor and cultivating implement towed by the tractor for power transmission are difficultly achieved, it is an object of this invention to provide a simple and trouble-free connection between the selection point on the tractor and the force imparting means attached to the implement proper.

Due to fact that many presently manufactured tractors are equipped with hydraulic pressure sources and high electric energy sources it is another object of this invention to actuate the blade cleaners by one of these sources of power, as an alternative power source for the wheel derived power source described herein.

It is a further object of this invention to translate the rotary motion of the ground contacting wheels or wheel of the implement being towed by a tractor into arcuate motion of the cleaner blades.

A further object of this invention is to provide a manual control for selecting the time of operation of the cleaner blade so that objectionable material may be removed from the shanks of the implement whenever necessary and still drain power from the prime mover only during the time the blade cleaners are so utilized. Thus, a greater number of tools may be towed by the tractor.

Another object of this invention is to provide an agricultural implement cleaning blade actuating mechanism which derives power from one of the ground contacting wheels and will function equally well when the wheel is in any vertical position with respect to the implement bed. The ground contacting wheels of such implements as stubble mulchers and subsoilers must be variable in a vertical direction with respect to the reference level of the implement bed so that the ground working blade may be positioned into the ground at various depths. This feature of standard agricultural implements requires that the actuating mechanism be operable at all vertical positions the wheel may assume with respect to the implement bed.

It is obvious that the power for raising and lowering the wheels may be derived from one of the high energy sources which are associated with the towing tractor. Therefore, it is an object of this invention to present an agricultural soil working implement requiring only a single source of power for operation of cleaner blades associated therewith and for the vertical adjustment of the implement wheels.

Yet another object of the present invention is to provide an agricultural implement cleaner which is readily installable and removable from agricultural implements in present use. By providing an "all-bolt" construction for the elements of the cleaner attachment the entire device may be easily fitted on to existing implements and equally easily removed. There is a second advantage present in an "all-bolt" construction and that is the advantage of easy adjustability of the elements with respect to one another to refine the operation of cleaner for operation which is a function of the changing conditions.

These and other objects will become apparent to those skilled in the particular art to which this invention pertains upon the disclosure made by the following drawings, specification and claims.

In the drawings:

FIGURE 2 shows a closeup view of part of the mechanism shown in FIGURE 1. The enlarged portion is of the power take-off means for the oscillating rod which operates the cleaner blade;

FIGURE 3 shows in closeup view the cleaner means and its mechanical power connections on the underside of the implement being towed by the tractor of FIGURE 1;

Figure 10:
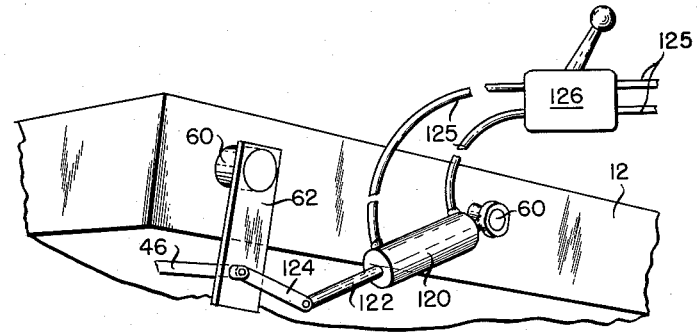
FIGURE 10 shows a motor power means, and specifically a reciprocating motor power means, for the operation of the cleaner blades.
Figure 11:
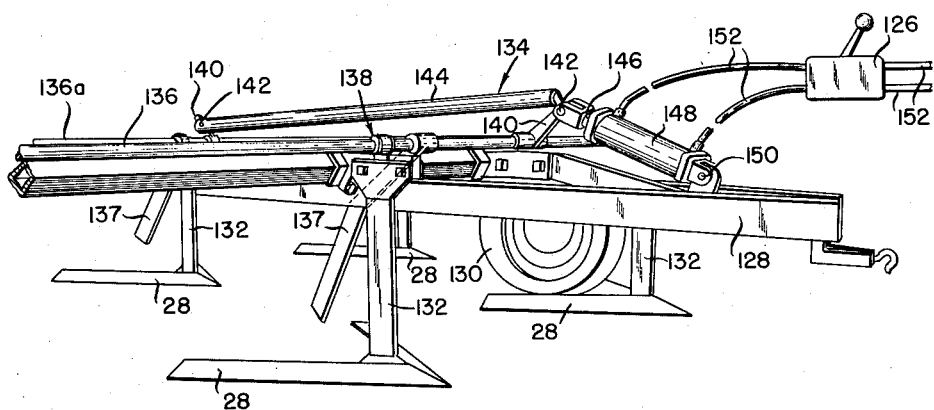

FIGURE 11 describes a modification of the power source shown in FIGURE 10.

Figure 1:
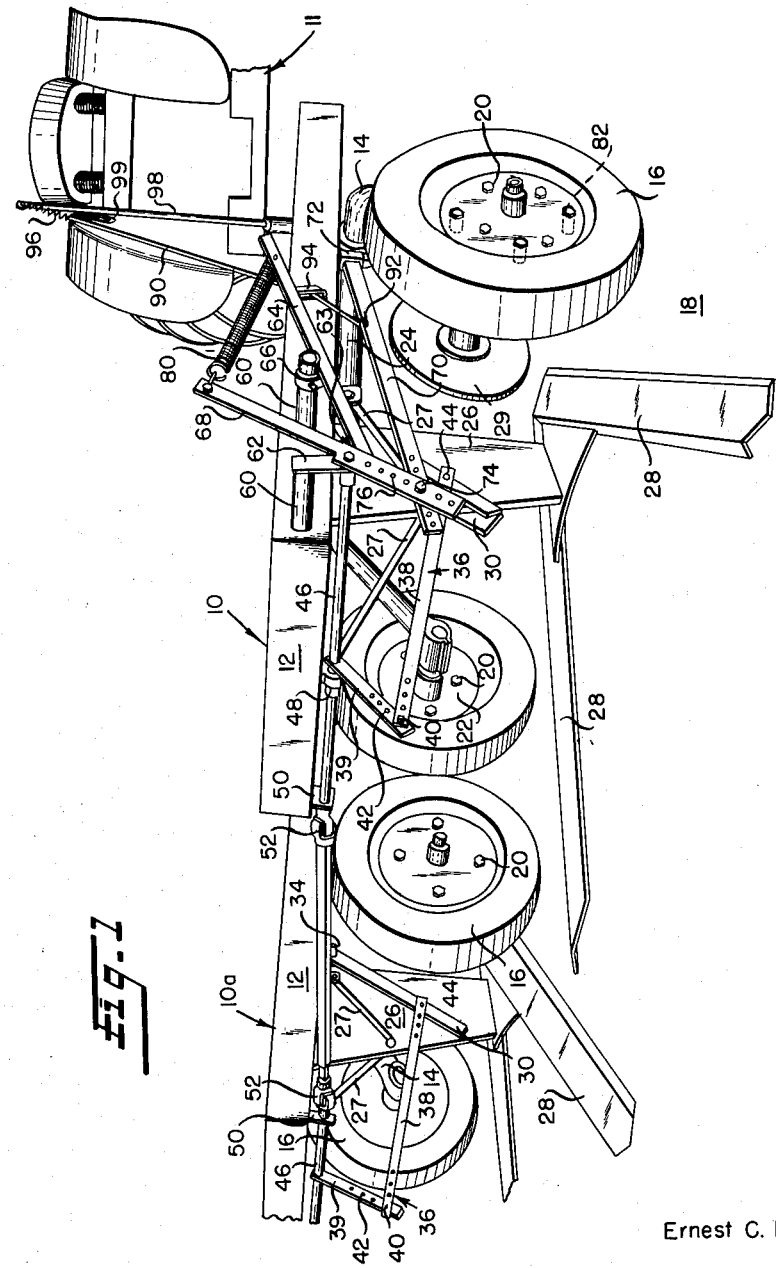
FIGURE 1 shows a rear perspective view of a tractor and cultivating implement combination in which the preferred form of the present invention is shown.

Referring now to the drawings, FIGURE 1 shows two agricultural implements or tools 10 and 10a arranged in adjacent relationship behind the prime mover or tractor 11. A suitable connection between the implements and the tractor is provided (not shown) as is customary in agricultural practice.

Each implement 10 and 10a has a generally horizontally disposed box type frame or bed 12 supported by vertically adjustable crank axles 14 on which wheels 16 are mounted for idler contact with the soil surface 18. Wheels 16 are constructed with a plurality of lug bolts 20 mounting the wheel onto the implement hub 22. The crank axles 14 on this type of implement are generally rotatable about the portion 24 (FIGURE 3) by means of a hydraulic cylinder (not shown) which operates on power derived from a tractor hydraulic system so that the ground contacting wheel 16 is vertically adjustable.

Depending from the undersurface of frame 12 are shank members 26 to which are connected at the bottom end thereof a soil contacting work blade 28. While the blade 28 may be of any configuration the particular type of blade shown in FIGURE 1 is a "stubble mulcher-type" blade. A soil surface breaking wheel 29 is also provided on tools 10 and 10a as is customary.

Referring now to the elements of FIGURE 1 constituting the instant invention a pair of implement shank cleaning blades 30 are pivotally connected to the undersurface of the frame 12 so that one each of the pair of blades is disposed on either side of the implement shanks 26.

Referring now to FIGURE 3 as well as FIGURE 1, cleaning blades 30 angularly contact shank member 26 on either side thereof and have sharpened edges 32 in contact with the surface of the shank. Cleaning blades 30 are pivotally connected to the undersurface of the frame 12 by means of rods 34 which are secured to the bottom side of the frame 12 by depending brackets 33 and by elongated bolt brackets 35. These brackets 35 have end plates 37 for clamping around the ends of the upper part of the shank 26.

Cleaning blades 30 are caused to move in an arcuate fashion upon the surfaces of shank member 26 by means of mechanical power transmitted through kicker elbows 36. These kicker elbows are composed of a forearm portion 38 and an upper arm portion 39 which arms are connected at the elbow position thereof by a pivotal connection such as a bolt 40. A number of openings 42 are provided longitudinally along each of the members 38 and 39 near the elbow position thereof to provide for adjustment of the "rest angle" of the kicker arm so that the cleaning blades may be adjusted for the length of the cleaning engagement stroke made by them. Forearm member 38 is pivotally connected to cleaner blades 30 by a pivotal connection such as bolt 44. Upper arm 39 of kicker elbow 36 is rigidly keyed at the shoulder position thereof by mechanical connection, welding, etc., to oscillating rod 46 which is of any cross section and is rotatably mounted on the undersurface of frame 12 by a loose fitting collar member 48 which is positioned immediately adjacent to the keyed connection of upper arm 39 and oscillating rod 46. Additionally, oscillating rod 46 is supported at the sides of the implement frame 12 by rotatable mounting brackets 50.

In FIGURE 1, oscillating rod 46 is provided with universal joints 52 to provide power connection between the two relatively movable agricultural implements 10 and 10a.

On one side of one of the implement frames 12 are cantilevered two rigid studs 60, best shown in FIGURE 2. These studs 60 may be held to the implement frame 12 by means of bolt construction or they may be permanently welded onto the frame. Depending from the free end of one of the studs is a brace 62 which is rigidly affixed to stud 60 by one end thereof and the other end rotatably supports the oscillating rod 46. Depending brace 62 constitutes the short leg of an L-bar brace 63 which is supported at the mid-portion of the long leg 64 by collar 66 which is rigidly attached to the second cantilevered stud 60.

Rigidly attached to oscillating rod 46 at the end protruding past depending brace 62 is a pivot member 68 which is connected to said oscillating rod at the mid-portion of the member. Pivotally connected to the lowermost end of pivot member 68 is a power take-off arm 70 which has a stud engaging hook member 72 positioned on the free end thereof in a depending fashion. The pivotal connection between pivot member 68 and power take-off arm 70 is made by a suitable means such as a nut and bolt construction 74 and the connection is provided with adjustable openings 76 longitudinally disposed along the contacting portions of the two members.

A spring 80 is connected between the uppermost end of pivot member 68 and the free end of L-bar brace long arm 64 so as to pull the topmost portion of pivot member 68 forward which in turn through oscillating rod 46 and kicker elbows 36 pulls the cleaning blade 30 rearwardly.

Figure 4:
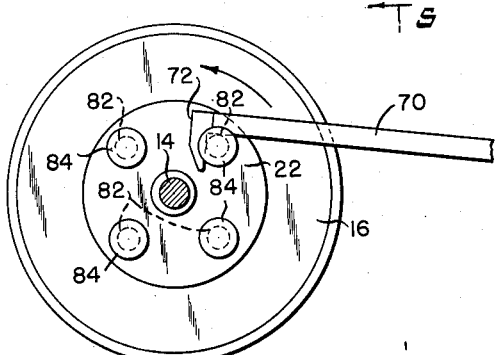
FIGURE 4 shows the co-action of the power take-off arm with the studs on the inside of the wheel shown in FIGURES 1 and 2.
Figure 5:
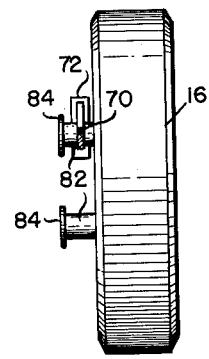
FIGURE 5 shows a frontal view of the wheel and the power take-off arm of FIGURE 4 taken on the line 5—5.

Mounted on the inside hub portion of the adjacent wheel 16 are a plurality of roller studs 82 which are best shown in FIGURES 4 and 5. Roller studs 82 may be easily attached to hub 22 of wheel 16 by extending bolts 20 through the hub to make them the spindles of the rollers 82 on the inside of the wheel. Roller studs 82 are provided with caps 84 so that a spool arrangement is effected for the roller studs 82.

When the cleaner mechanism is engaged for operation, hook 72 depending from power take-off arm 70 is dropped into engagement with the rotating roller studs 82 and is then pulled forward by the forward rotation of the wheel 16 which causes pivot member 68 to pivot about the midportion thereof where oscillating rod 46 is rigidly affixed to the pivot member 68. The pivot member then rotates so as to impart rotary motion to the oscillating rod which then forces upper arm member of the kicker elbow assembly 36 downwardly so as to provide for the arcuate and pivoting motion of cleaning blades 30 positioned on either side of implement shank 26. This motion is imparted to the members against the spring tension of spring 80.

To effect the lowering of power take-off arm 70 a cable 90 is provided which is connected to power take-off arm 70 at a selected point 92 and then passes through pulley 94 which is depended from the longer leg of L-bar brace 63. Cable 90 is provided with a longitudinally arranged spring 96 which connects the cable with cable rod 98 at the top portion thereof.

Figure 9:
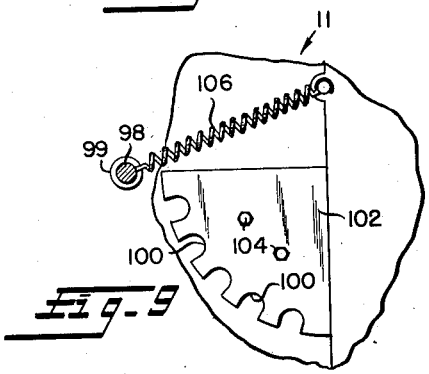
FIGURE 9 shows the operator control portion of the cleaning device which is mounted on the tractor pulling the implement.

Cable rod 98 may be provided with a ball-and-socket mounting 99 at the lower end thereof onto tractor 11 as shown in FIGURE 9. Selector notches 100 are provided along the outside edge of a plate 102 which is mounted to tractor 11 by means of bolts 104. Cable rod 98 is spring biased forwardly and inwardly toward the notch plate 102 by spring 106 which is affixed to a stationary portion of the tractor 11.

*Operation of the Cleaning Mechanism*

In order to engage the mechanism into operative actuation the operator of the tractor merely pulls the cable rod 98 back to one of the notches 100 in notch plate 102 whereby the cable is given slack. This slack is taken up by means of power take-off arm 70 dropping down into engagement with roller studs 82. As the idler wheel 16 moves forward the roller stud will define an arc of forward motion. The hook member 72 of the power take-off arm 70 will then be pulled forward and the bottom end of pivot member 68 will be pulled forward against the spring tension of spring 80. The oscillating rod 46 will then be rotated by reason of its being rigidly keyed to the pivot member 68. Kicker elbows 36 will then be activated by reason of oscillating rod 46 being so rotated and upper arm member 39 will be forced downwardly and forearm member 38 will be thrust forwardly which will in turn provide for the arcuate and pivoting motion of cleaner blades 30 along either side of shanks 26.

By leaving the cable rod 98 in the selected notch 100 against the spring tension of spring 106 the hook member 72 will engage each of the plurality of roller studs as they come into contact with this hook member. As the idler wheel 16 rolls along the surface of the ground 18 the power take-off arm 70 will be alternatively pulled forward by reason of contact with one of the studs 82 and then released as the next adjacent roller stud 82 contacts the lower portion of power take-off arm 70 which bounces the power take-off arm clear from the preceding roller stud which enables spring 80 to pull the arm 70 rearwardly until it engages the next roller stud 82 and is again pulled forward. This continuous pulling forward and releasing to allow rearward spring driven motion provides for the oscillation of rod 46 which in turn provides for continuous pivotal motion of cleaner blades 30 which effects a continuous cleaning action on the implement shanks 26.

If the type of soil which is being worked by the implements or tools 10 and 10a requires only occasional shank cleaning then the cable rod 98 may be placed in operative notch 100 only for that portion of time which cleaning is desired including a single cleaning motion or any multiple thereof. Thus the cleaning action of the cleaning blades is controlled independently of the motion of wheels 16.

*Modifications*

Figure 6:
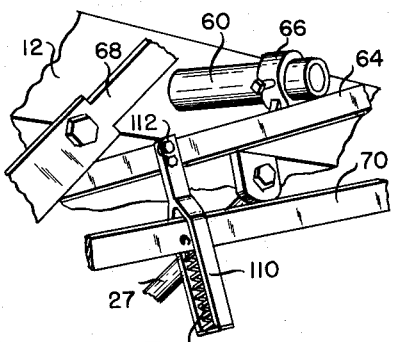
FIGURE 6 shows a modification of the power take-off mechanism of FIGURE 2 in which a bifurcated stabilizing arm is shown.

A first modification, shown in FIGURE 6, is to provide a bifurcated guide member 110 which is connected to the long leg of L-bar brace member 63 by a suitable connection means 112 so that power take-off arm 70 is guided for rectilinear vertical motion to prevent whipping action of this arm 70 which might result from traveling over rough ground so that the power take-off arm 70 will not be vibrated beyond the innermost surface of cap 84 of roller stud 82. Also a spring 114 may be provided within guide member 110 so as to forceably pull arm 70 downward when cable 90 is stacked.

Figure 7:
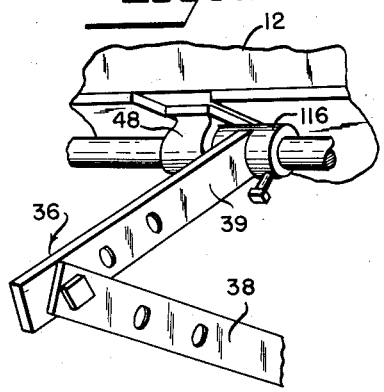
FIGURE 7 shows a modification of the kicker arm collar shown in FIGURE 3 in which the collar is slidably mounted on the oscillating rod.

To provide for a cleaner mechanism on implements or tools wherein the shanks 26 are laterally movable with respect to the frame 12 of such tools a set-screw collar 116 is provided at the shoulder position of kicker elbows 36 so that the kicker elbows 36 and the cleaner blades 30 may be also laterally movable. This modification is shown in FIGURE 7 in a cutaway view. In this modification the pivot rod 36 in FIGURE 3 of cleaner blades 39 must be also laterally movable.

Figure 8:
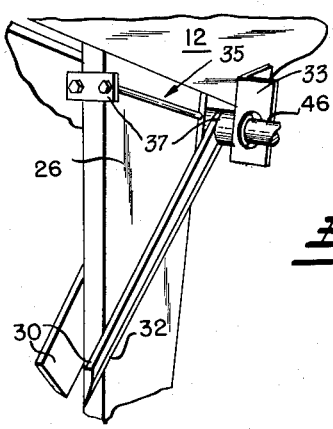
FIGURE 8 shows an additional modification of the cleaner blade structure in which the oscillating rod is positioned at the frontmost edge of the shank of the implement pulled by the tractor shown in FIGURE 1.

A third modification is shown in FIGURE 8 wherein oscillating rods 46 are positioned at the front edge of the shank 26 and have rigidly attached thereto the cleaner blades 30. Such a modification obviates the necessity of providing kicker elbows 36 for the cleaner blades 30. Rods 46 are secured in this position by depending brackets 33 and elongated rod brackets 35 in the same manner as rod 34 of FIGURES 1–3.

A fourth modification which may be made is to rigidly affix the cable rod 98 upon tractor 12 and provide a spring longitudinally mounted between cable 90 and the topmost end of cable rod 98 such as spring 96. A longitudinal spring handle operation may be used to manually stretch the spring. This spring handle 99 is depended from the connection between the spring and cable. By stretching the longitudinal spring continuously the operator may cause continuous motion of blades 30 due to the fact that this hook member 72 will continuously engage studs 82. This modification is shown in FIGURES 1 and 2.

It should also be noted that by employing a suitable depending brace 62 from the cantilevered stud 60 the long arm of the L-bar brace 64 may be eliminated and the forwardmost end of spring 80 attached to a stationary portion on frame 12.

Any particular gimbal-type connection may be used for universal joints 52 to provide for relative movement between the respective implements 10. Alternatively a coaxial rotary transmitting cable may be used for this power transmission.

*Alternative Power Source*

To accomplish the object of utilizing the hydraulic pressure sources and high electric energy sources available in conjunction with presently manufactured agricultural prime movers reciprocating motor means such as, hydraulic cylinder motors, air cylinder motors, and electric solenoid-type motors may be employed to operate the blade cleaners of this invention.

FIGURE 10 shows a reciprocating motor means 120 pivotally connected by the body portion thereof to the frame member 12 in the position occupied by the power take-off assembly in FIGURES 1 through 3. The piston rod 122 of the motor is pivotally connected to a power lever 124 which corresponds to pivot member 68 in FIGURES 1 through 3. The power lever 124 is rigidly attached to the end of the oscillating shaft 46 of the cleaning blade attachment.

The operator of the tractor and agricultural implement unit may operate the motor means 120 by manual operation of a power supply switch 126 which is positioned upon the tractor within a convenient distance of the operator. Power lines 125 connect the source of hydraulic, air or electric power, through switch 126 to the body portion of cylinder motor means 120. This source of power may be the same as that operating the wheel cylinder or may be a second source, both sources preferably being positioned upon the tractor.

A modification of the motor arrangement is shown in FIGURE 11 wherein a frame member 128 is shown which is supported by idler wheels 130 and has depended therefrom ground contacting shank members 132. These shank members have the usual soil working blades 28 connected thereto.

The cleaning blade assembly 134 consists of oscillating rods 136 and 136A rotatably mounted to the frame member 128 by collars 138 along the lateral line described by the positioning of the depending shank members 132. There may, of course, be more than two of these rods 136 and when associated with power translating gearing they need not be positioned lateral to the path of travel of the implement. The cleaning blades 137 are rigidly connected to rods 136.

Rigidly connected to each of the rods 136 to 136A at a selected point are power levers 140 which are pivotally connected at a first connection 142 by their opposite ends to a translating bar 144. At one or more of these pivotal connections 142 there is, also, pivotally connected the free end of a reciprocable rod 146 of a motor cylinder means 148. The motor housing is pivotally connected to the frame member 128 by a second connection 150.

The cylinder motor means 148 is supplied by power through power lines 152 which connect with the power source of the prime mover through a power switch 126.

The cleaning blades 137 are shown in carrying position, which is on the trailing edge of the shank members 132 as is also shown in FIGURES 1 through 3. When the motor cylinder is actuated the blades 137 are caused to swing forward and come into scraping contact with the shank member 132 and thereby clear the same of accumulated trash, weeds and mud. The reciprocable rod 146 is contracted to a position within the housing at carrying position and extended to the forward position after the blades have swung forward to provide the cleaning action.

It is to be noted that both the power take-off powering means and the motor means of actuation for the cleaning blades are inactive except when in use regardless of the forward motion of the implement-prime mover unit, so that unnecessary wearing on the structural members thereof is prevented. Additionally both powering means are operative at all vertical distances separating the ground contacting idler wheel and the implement frame.

While the invention has been described in connection with different embodiments thereof, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and fall within the scope of the invention or the limits of the appended claims.

I claim:

1. An agricultural implement cleaner powering means for use on an implement having at least one earth working member, and at least one supporting ground contacting wheel height adjustable with respect to said earth working member, comprising a plurality of studs affixed to said wheel, a power take-off means pivotable in the plane of said studs, said power take-off means pivotally lowerable for selective engagement with said studs, a pivot member pivotally connected to a stationary portion of said implement and pivotable about a line fixed with respect to the earth working member with respect to said power take-off means, an oscillating rod rigidly affixed to said pivot member and furnishing support means therefor and rotatably mounted upon said implement and coaxial with the pivot means line of pivot, a cleaner blade means pivotally attached to said implement and in scraping contact with said earth working member, connection means connecting said oscillating rod with said cleaner blade, said cleaner blade powered by the motion of said studs transmitted in order through said power take-off means, said pivot member, said oscillating rod, and said connection means.

2. An agricultural implement cleaner powering means as defined in claim 1 including, a guide means rigidly connected to a stationary portion of said implement for guiding the pivotal motion of said power take-off means.

3. An agricultural implement cleaner powering means as defined in claim 1 wherein said studs are positioned on the inside rim of said wheel, and caps affixed to the free ends of said studs to provide a spool-type arrangement for said power take-off means engagement with said studs.

4. An agricultural implement cleaning powering means as defined in claim 1 wherein said connection means consists of a kicker elbow having pivotal connections at a first position thereon and at the elbow position thereof and at a second position thereon, said kicker elbow rigidly affixed to said oscillating rod at the second position thereof and pivotally connected to said cleaner blade means at the first position thereof, said cleaner blade means consisting of pivotal blade-type cleaning members positioned on either side of said ground contacting member.

5. An agricultural implement cleaner powering means as defined in claim 1 wherein said connection means consists of a rigid connection between said oscillating rod and said cleaner blade means, said cleaner blade means comprising blade-type members disposed on either side of said ground contacting member.

6. An agricultural implement cleaner powering means as defined in claim 5 wherein said oscillating rod is rotatably mounted at the forwardmost edge of said ground contacting member on the undersurface of said implement.

7. An agricultural implement unit comprising a prime mover means, a soil working implement towed by said prime mover means, said implement having a horizontally extending frame, at least one ground contacting shank member vertically disposed from the undersurface of said frame, and at least one supporting ground contacting wheel height adjustable with respect to said shank member, a plurality of studs affixed to said wheel, a power take-off means pivotable in the plane of said studs, said power take-off means pivotally lowerable for selective engagement with said studs, selective engagement means for lowering and raising and maintaining in a given selected position said power take-off arm connected to said prime mover means, a pivot member pivotally connected to a stationary portion of said frame and pivotable about a line fixed with respect to said shank member and pivotally connected to said power take-off means, an oscillating rod rigidly affixed to said pivot member and furnishing therefor and rotatably mounted upon said frame and coaxial with the pivot means line of pivot, a cleaner blade means pivotally attached to said implement and in scraping contact with said shank member, connection means having at least one pivotal connection therein connecting said oscillating rod with said cleaner blade, said cleaner blade powered by the motion of said studs transmitted in order through said power take-off means, said pivot member, said oscillating rod, and said connection means.

8. An agricultural implement unit as defined by claim 7 wherein, said selective engagement means for lowering and raising said power take-off arm comprises a flexible cable connected to the mid-portion of said power take-off arm by one end thereof, a cable rod supporting the other end of said cable upon said prime mover means, said cable rod universal joint mounted upon said prime mover means, a selector plate means connected to said prime mover means and having an arcuate perimeter portion, selector notches positioned around the length of said perimeter portion, a spring means connected between said cable rod and said prime mover means for retaining said cable rod resiliently in one of said notches, and a cable tensioning means associated with said cable for allowing stretching of said cable relative to said cable rod.

9. An agricultural implement unit as defined by claim 8 wherein, a handle means depends from said cable at the cable rod end thereof, said handle means operable by action of an operator pulling said handle means against the tension of said cable tensioning means whereby said flexible cable is caused to slack and said power take-off arm is caused to be lowered into powering contact with said studs.

10. Agricultural implement blade-type cleaner powering means for use on a plurality of towed agricultural implements, each of said implements having at least one ground contacting member and at least one supporting ground contacting wheel, said powering means comprising a power take-off means affixed to a first of said implements and positioned for pivoting motion in a plane parallel to the plane of rotation of said ground contacting wheel, a plurality of studs affixed to said ground contacting wheel, said power take-off means pivotally controllable for selective engagement with said studs by manual selection means, a pivot means connected to said power take-off means and pivotable when said power take-off means is selectively engaged with said studs, said pivot means spring biased against pivoting, a first oscillating rod rigidly affixed to said pivot means and rotatably mounted upon said first of said implements, a first cleaner means mounted for pivotal scraping contact with said ground contacting member, connection means connecting said cleaner means with said rod whereby said cleaner blades are powered by said powering means through said rod, said cleaner being positioned in scraping contact with said ground contacting member, a second of said implements having a second oscillating rod rotatably mounted thereupon, a second cleaner means positioned in scraping contact with the ground contacting member of said second of said implements, connection means connecting said second cleaner means with said second oscillating rod whereby said second cleaner means is powered by said second oscillating rod, said second oscillating rod being universally connected to said first oscillating rod whereby said powering means powers said second oscillating rod through said first oscillating rod, said universal connection providing for relative movement between the first of said implements and the second of said implements.

11. An agricultural implement ground contacting shank cleaner for use on tractor towed implements each having a horizontally extending frame, at least one ground contacting shank member vertically disposed from the undersurface of said frame, a soil working blade disposed on said shank member at the bottom end thereof, and ground contacting idler wheels connected to said frame, said cleaner comprising at least one pair of cleaner blades pivotally connected to the undersurface of a frame of one of said implements, one each of said pair of blades disposed on either side of each of said shanks, kicker elbows pivotally connected at the wrist position to said blades, said elbows pivotally connected and adjustable at the joint thereof, an oscillating rod rotatably mounted upon said frame and having its axis perpendicular to the direction of travel of said implement, said kicker elbows rigidly affixed to said rod at the shoulder position thereof, a pivot member rigidly secured at the midportion thereof to said oscillating rod, a power take-off arm pivotally and adjustably connected to the lower end of said pivot member, an L-bar brace rigidly attached to said frame by the small arm thereof and pivotally mounted about said oscillating rod at the corner thereof, said L-bar being rigidly affixed to said frame at a midposition of the long leg thereof, a spring connected between the top end of said pivot member and the end of the long leg of said L-bar brace, a cable connected to said power take-off arm passing through an implement pulley and secured to a selector device mounted on said tractor, said selector device comprising a cable supporting rod pivotally affixed to said tractor, a spring means affixed between said rod and a portion of said tractor whereby said cable is normally under tension of said spring means, a notched rack for holding said rod in rearward position against said spring means tension, said power take-off arm having a hook member at the non-connected end thereof at least one of said wheels of said implement having at least three roller studs mounted on the inside hub thereof so as to contact said hook member when said cable rod is allowed to pivot rearwardly against said spring means tension, said cable having a longitudinal cable spring mounted therein to allow for stretching of said cable, said oscillating rod having a power connection means rigidly affixed to one end thereof for connection of a connecting power rod thereto for purposes of transmitting oscillating motion to an adjacent towed implement and its associated oscillating rods.

12. An agricultural implement cleaner for use on an implement having a horizontally extending unitary frame, at least one earth working member having the largest cross sectional area disposed perpendicular to the line of motion of said implement, and at least one supporting ground contacting wheel height adjustable with respect to said earth working member, comprising a rotatable shaft, brackets supporting said rotatable shaft upon said frame adjacent to and near the leading edge of the upper portion of said ground contacting member, cleaning means rigidly secured to said rotatable shaft and extending therefrom to the rear of said ground contacting means diagonally downward across the full width of the largest cross sectional area sides of said earth working member, said cleaning means being of a length substantially equal to the height of said earth working member exposed from the earth, said cleaning means consisting of paired cleaner blades disposed in scraping contact by edges thereof with said earth working member across the largest cross sectional area of both sides thereof and said blades positioned edge-wise with respect to said earth working member and having the contacting edge thereof sharpened, an oscillating rod rotatably mounted upon said frame, connection means connecting said oscillating rod and said cleaner blades and providing for changing the oscillating motion of said rod to the pivoting motion of said cleaner blades, a powering means for said oscillating rod, a selector means for controlling the power delivered to said oscillating rod.

13. An agricultural implement ground contacting shank cleaner as defined in claim 12 wherein said control means is positioned within control of the operator of the prime mover towing said implement.

References Cited in the file of this patent

UNITED STATES PATENTS

| 91,328 | Godfrey | June 15, 1869 |
| 132,857 | Place | Nov. 5, 1872 |
| 667,741 | Skakel | Feb. 12, 1901 |
| 1,102,868 | Calhoun | July 7, 1914 |

FOREIGN PATENTS

| 549,189 | Canada | Nov. 26, 1957 |
| 477,530 | Germany | June 8, 1929 |